United States Patent [19]
Suzuki

[11] Patent Number: 5,233,581
[45] Date of Patent: Aug. 3, 1993

[54] OPTICAL-HEAD DRIVE

[75] Inventor: Hiroyuki Suzuki, Higashihiroshima, Japan

[73] Assignee: Sharp Kabushiki Kaisha, Osaka, Japan

[21] Appl. No.: 827,074

[22] Filed: Jan. 28, 1992

[30] Foreign Application Priority Data

May 16, 1991 [JP] Japan ................... 3-111836

[51] Int. Cl.$^5$ ................................ G11B 7/00
[52] U.S. Cl. ..................... 369/44.19; 369/109
[58] Field of Search .......... 369/44.17, 44.19, 112, 369/110, 44.14, 44.17, 44.19, 112, 110, 109, 111, 44.21

[56] References Cited

U.S. PATENT DOCUMENTS

| 4,403,316 | 9/1983 | van de Veerdonk | 369/44.19 |
| 4,669,073 | 5/1987 | Wakabayashi et al. | 369/44.19 |
| 4,688,201 | 8/1987 | Towner et al. | 369/44.19 |
| 4,761,774 | 8/1988 | Ishibashi et al. | 369/44.19 |
| 4,773,052 | 9/1988 | Sugiura et al. | |
| 4,912,693 | 3/1990 | Goda | 369/44.14 |
| 5,132,953 | 7/1992 | Matsubayashi | 369/110 |

FOREIGN PATENT DOCUMENTS

| 3533647 | 3/1986 | Fed. Rep. of Germany. | |
| 57-138063 | 8/1982 | Japan | 369/44.19 |
| 59-160832 | 9/1984 | Japan | 369/44.17 |
| 59-162669 | 9/1984 | Japan | 369/44.19 |
| 59-217238 | 12/1984 | Japan. | |
| 63-020732 | 1/1988 | Japan | 369/44.19 |

Primary Examiner—Aristotelis Psitos
Assistant Examiner—P. W. Huber
Attorney, Agent, or Firm—Birch, Stewart, Kolasch & Birch

[57] ABSTRACT

An optical-head drive having a guide member secured in the vicinity of the center of an optical disk, an optical head composed of a diffraction grating for splitting a light beam into two sub-beams, an objective lens for converging the sub-beams respectively on the optical disk and a member to be guided slidingly by the guide member, and driving means which moves the optical head to a desired radius location on the optical disk while swinging the optical head around the guide member for correcting the angle of the diffraction grating by making the member to be guided slide along the guide member. This configuration enables the correction of the angle of the diffraction grating to be performed simultaneously with the movement of the optical head.

14 Claims, 8 Drawing Sheets

OPTICAL-HEAD DRIVE

FIELD OF THE INVENTION

The present invention relates to an optical-head drive for moving an optical head, which is capable of, for example, recording and reproducing data on an optical disk, in a radial direction of the optical disk.

BACKGROUND OF THE INVENTION

In an optical disk drive, a track-following servo system is used to make a light beam emitted by an optical head be projected accurately onto a track on an optical disk. As for detection of tracking errors, one-spot method and three-spot method are known.

The one-spot method employs an optical-head drive of a so-called swing-arm type which moves an optical head in an arc. This allows simplification in the configuration of an optical-head drive. With this method, however, it is difficult to achieve accurate tracking.

Figure 8:
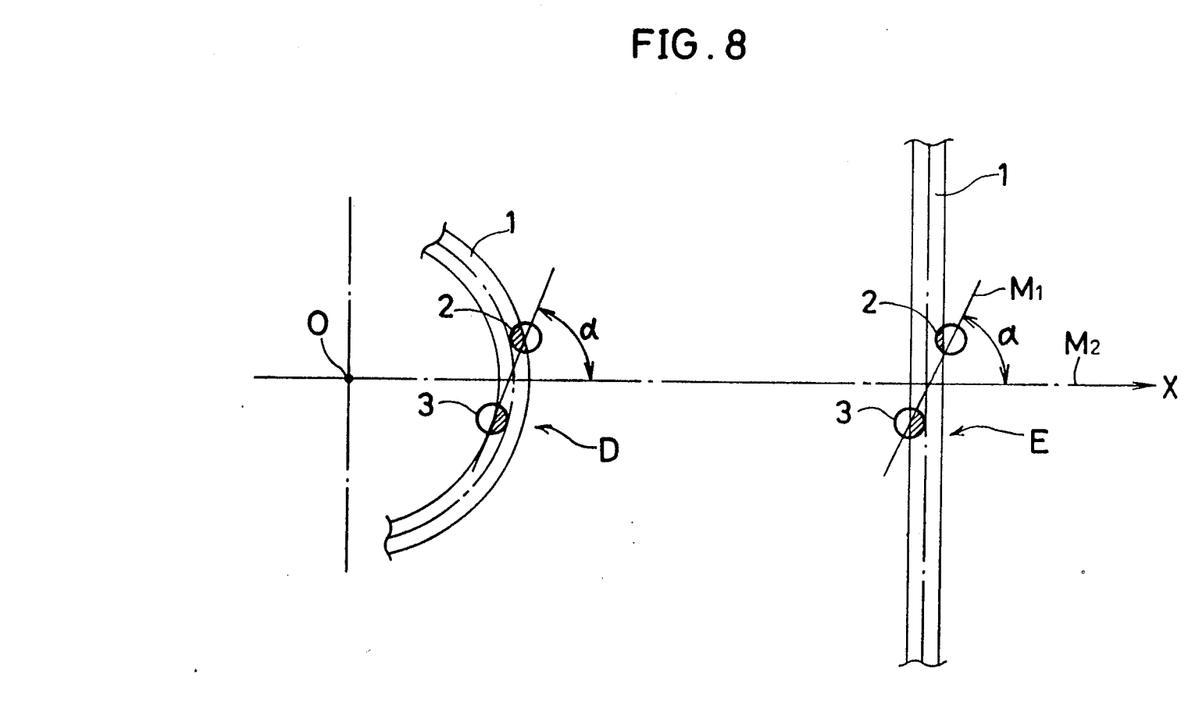
FIG. 8 is an explanatory view illustrating sub-beams on tracks on an optical disk according to a conventional example.

Meanwhile, with the three-spot method, as illustrated in FIG. 8, in addition to a main beam for detecting a signal, two sub-beams 2 and 3 are projected onto each side of the main beam on a track 1 of the optical disk. The optical head is driven so that the sub-beams 2 and 3 are equally projected onto the track 1. The main beam and sub-beams are produced by splitting a light beam into zeroth-order diffracted light, positive first-order diffracted light and negative first-order diffracted light by means of a diffraction grating.

When moving the optical head along a guide shaft from the inside (D portion shown in FIG. 8) toward the outside (E portion) of the optical disk, it is very important to manufacture the guide shaft with high-precision in order to move the optical head correctly in a radial direction (X direction) of the optical disk. Moreover, it is also necessary to fix both ends of the guide shaft to the chassis of an optical disk drive accurately. These requirements cause a drawback that the cost of manufacturing the optical-head drive increases.

Furthermore, the radius of curvature of the arc of the track 1 varies from the inside to the outside of the optical disk (as for the outside of the optical disk, it is assumed for the sake of explanation that the radius is infinite and the track 1 is illustrated as a straight line in the figure). Therefore, even when an angle $\alpha$ formed by a straight line $M_1$ connecting the centers of two sub-beams 2 and 3 and a straight line $M_2$ passing through the center O of the optical disk and the midpoint of the straight line $M_1$ takes the same value in the inside and the outside, i.e., when the optical head is correctly moved in a radial direction of the optical disk, the area of a portion of the track 1 exposed to the sub-beam 2 varies from the area of a portion of the track 1 exposed to the sub-beam 3. This results in a decrease in the accuracy of tracking.

Namely, when the sub-beams 2 and 3 strike portions of the track 1 having the same area respectively in the inside, the area of a portion of the track 1 exposed to the sub-beam 2 is smaller than that exposed to the sub-beam 3 in the outside. Then, the track-following servo controls the sub-beams 2 and 3 so that portions of the track 1 having the same area are exposed to the sub-beams 2 and 3, respectively. In this case, the area of the portions of the outer track 1 exposed to the sub-beams 2 and 3 are smaller than that of the inner track 1 exposed to the sub-beams 2 and 3. This causes a lowering of the accuracy of the tracking.

Additionally, regarding a mechanism for moving the optical head along the guide shaft, for example, a mechanism using a feed screw and a rack-and-pinion mechanism are listed. Both of them, however, require high-precision components, and which contributes to an increase in the cost of manufacturing the optical-head drive.

SUMMARY OF THE INVENTION

An object of the present invention is to provide an optical-head drive which fulfills accurate tracking whether an optical head is moved toward the innermost portion or toward the outermost portion of an optical disk.

In order to achieve the above object, an optical-head drive according to the present invention is characterized in having: a guide member mounted in the vicinity of the center of an optical disk; an optical head including a diffraction grating for splitting a light beam into two sub-beams, an objective lens for converging each of the sub-beams on the optical disk, and a member to be guided slidingly by the guide member; and driving means which moves the optical head to a desired radial location on the optical disk while swinging the optical head around the guide member for a correction of the angle of the diffraction grating by causing the member to be guided to slide along the guide member.

According to the configuration, a correction of the angle of the diffraction grating is performed simultaneously with the movement of the optical head. Therefore, the tracking is accurately performed independently of radial location of the optical disk.

For a fuller understanding of the nature and advantages of the invention, reference should be made to the ensuing detailed description taken in conjunction with the accompanying drawings.

BRIEF DESCRIPTION OF THE DRAWINGS

FIG. 1 to FIG. 6 illustrate a first embodiment of the present invention.

DESCRIPTION OF THE EMBODIMENTS

Referring to FIG. 1 to FIG. 6, the following will describe a first embodiment of the present invention.

In an optical-head drive according to the present invention, an optical head 10 is located on a chassis 13

Figure 1:
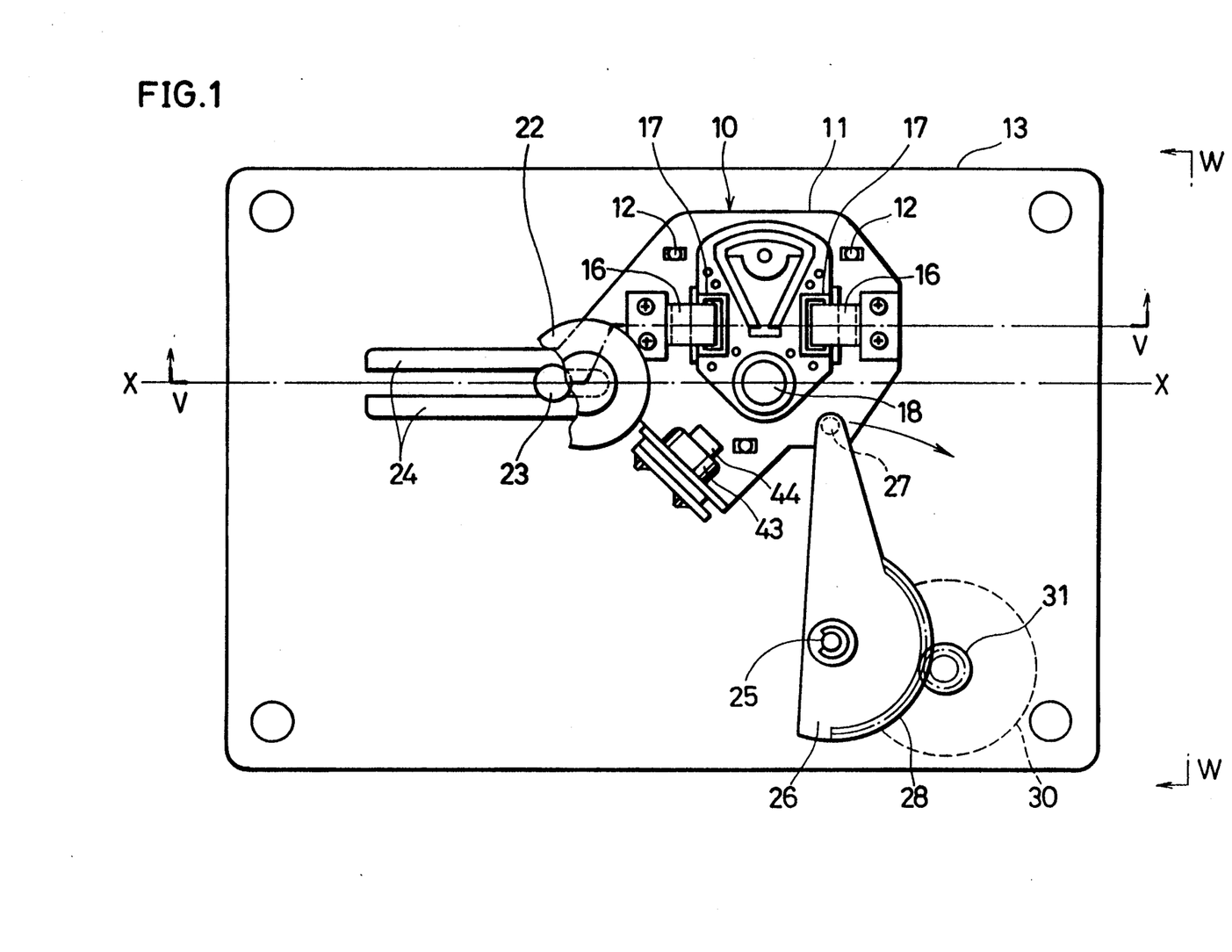
FIG. 1 is a schematic plan view illustrating an optical-head drive.
Figure 3:
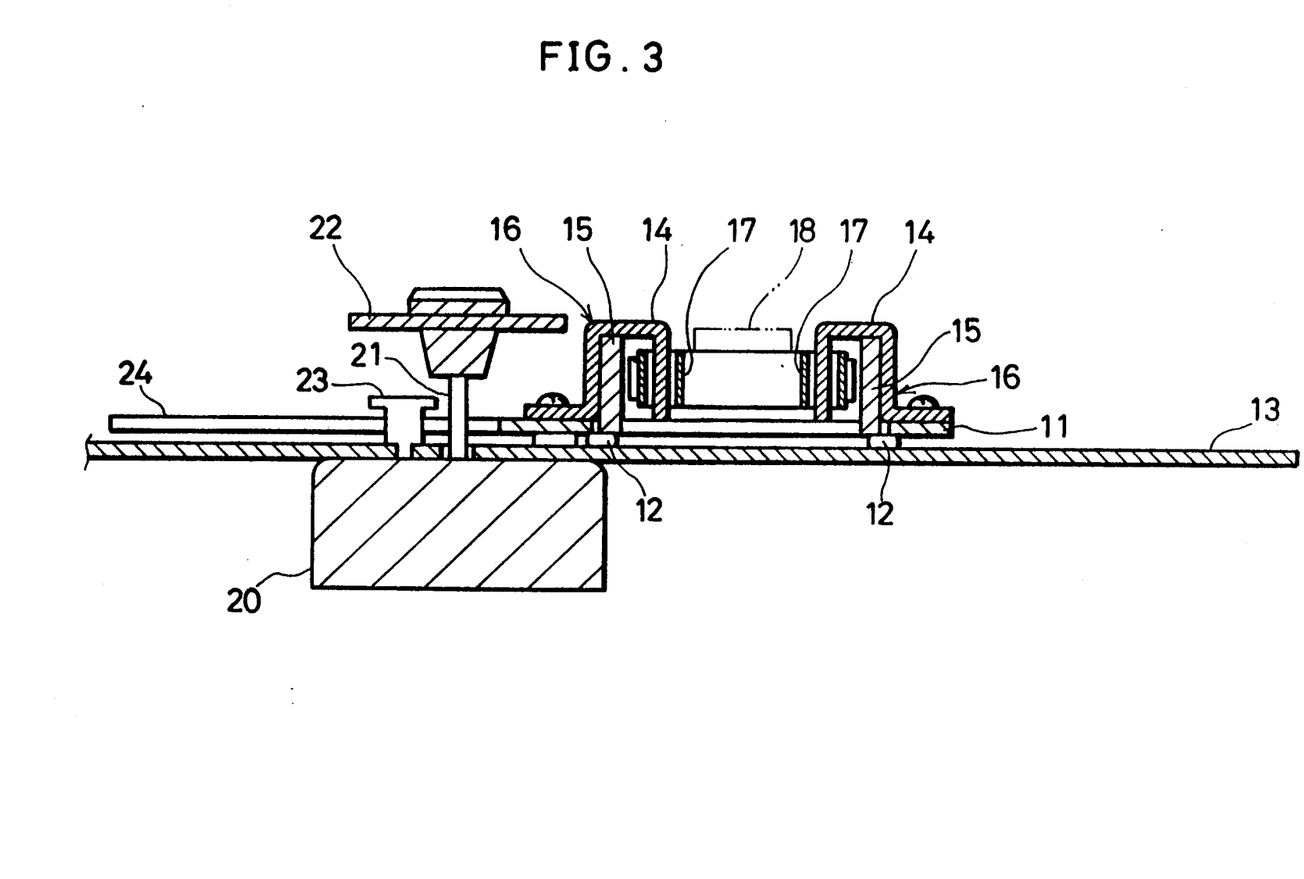
FIG. 3 is a view illustrating a cross-section of the first embodiment cut across a line V—V as shown in FIG. 1.
Figure 4:
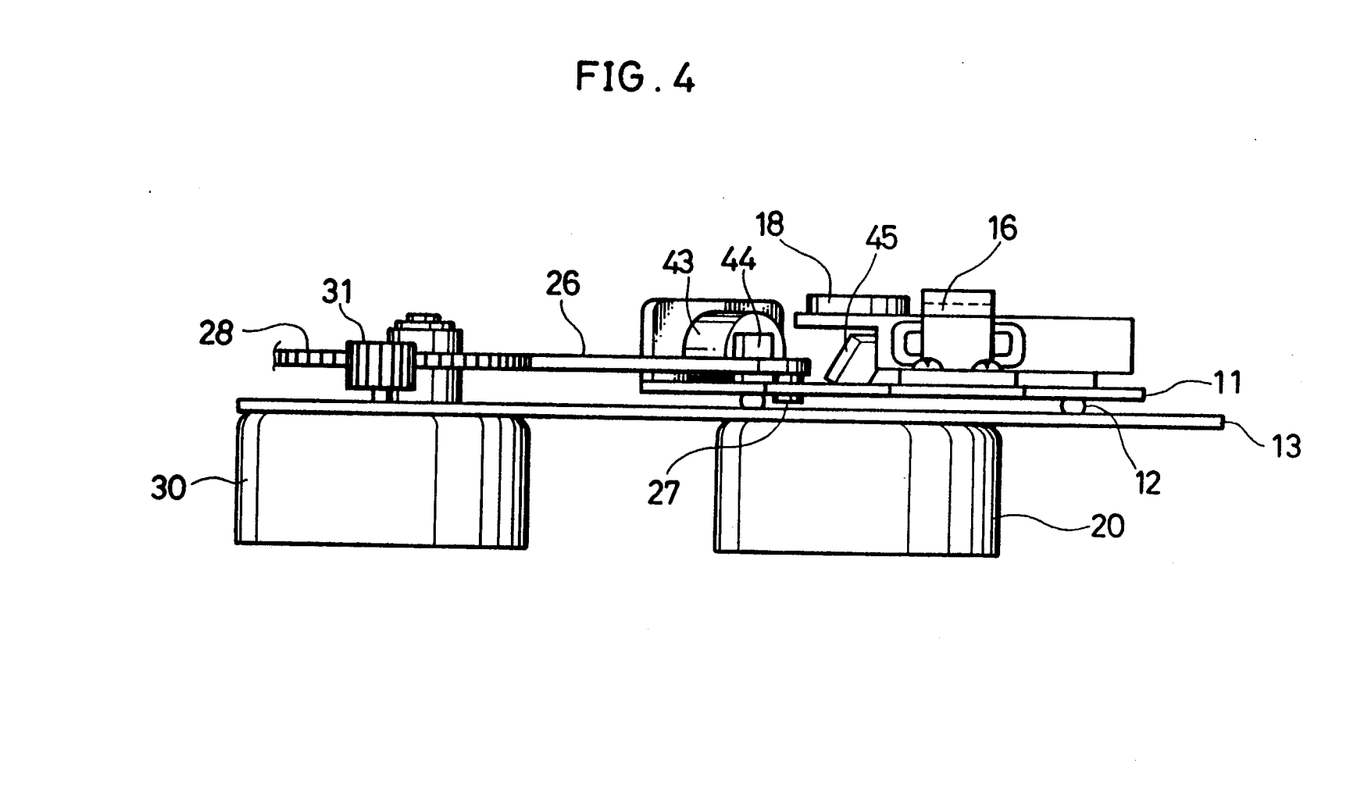
FIG. 4 is a view illustrating the first embodiment from a line W—W side as shown in FIG. 1.

(supporting member). As illustrated in FIGS. 1, 3 and 4, a base 11 of the optical head 10 is supported by a plurality of balls 12 (rolling members) so that it can move freely on the chassis 13. Mounted on the base 11 are a pair of magnetic circuits 16. Each of the magnetic circuits 16 is composed of a yoke 14 and a magnet 15.

The yoke 14 is formed somewhat like a U shape. The magnets 15 are disposed adjacent to the chassis 13 so as to produce a magnetic attraction effect between the magnets 15 and the chassis 13.

An objective lens 18 is provided with coils 17 so that it is driven by the magnetic circuits 16.

A semiconductor laser 43 is mounted on the base 11. Installed in front of the semiconductor laser 43 is a diffraction grating 44 for splitting a light beam from the semiconductor laser 43 into a main beam and two sub-beams. The main beam and two sub-beams are reflected by a mirror 45 secured to the base 11, and converged on an optical disk (not shown) by the objective lens 18, respectively.

A spindle motor 20 is affixed to the chassis 13. Mounted on a rotation shaft 21 of the spindle motor 20 is a turn table 22 for carrying and rotating the optical disk.

In the vicinity of the rotation shaft 21, there is a guide shaft 23 (guide member) that is vertically installed in the chassis 13. When the optical head 10 is in a position facing the innermost portion of the optical disk (see FIG. 1), the guide shaft 23 is located on a straight line connecting the center of the objective lens 18 and the center of the optical disk, i.e., the center of the turn table 22. As illustrated in FIG. 3, the guide shaft 23 is located in the left side of the rotation shaft 21 of the turn table 22 whereas the objective lens 18 is located in the right side thereof.

A pair of rails 24 (member to be guided) parallel to each other are provided integrally with the base 11 of the optical head 10 so that they protrude to the rotation shaft 21 and guide shaft 23 side. The rails 24 and base 11 may be provided as individual components and integrated into a single component. When the optical head 10 is in the position facing the innermost portion of the optical disk (see FIG. 1), the rails 24 are parallel with the straight line X—X.

The rotation shaft 21 and guide shaft 23 are placed between the rails 24. There are sufficient clearances between the rails 24 and the rotation shaft 21. On the contrary, the guide shaft 23 fits securely between the rails 24 without play so as to enable the rails 24 to freely slide along and rotate around the guide shaft 23.

An arm 26 is mounted on the chassis 13 through a shaft 25 so that it can rotate freely. One end of the arm 26 is connected to the base 11 through a shaft 27 so that it can rotate freely. The arm 26 is provided with a gear 28 in an arc around the shaft 25, and the gear 28 engages with a gear 31 affixed to the rotation shaft of a motor 30.

When the arm 26 is driven by the motor 30 and moves clockwise from the position facing the innermost portion of the optical disk (see FIG. 1), the rails 24 are guided by the guide shaft 23. This moves the base 11 of the optical head 10 in an arc toward the outside of the optical disk.

Figure 2:
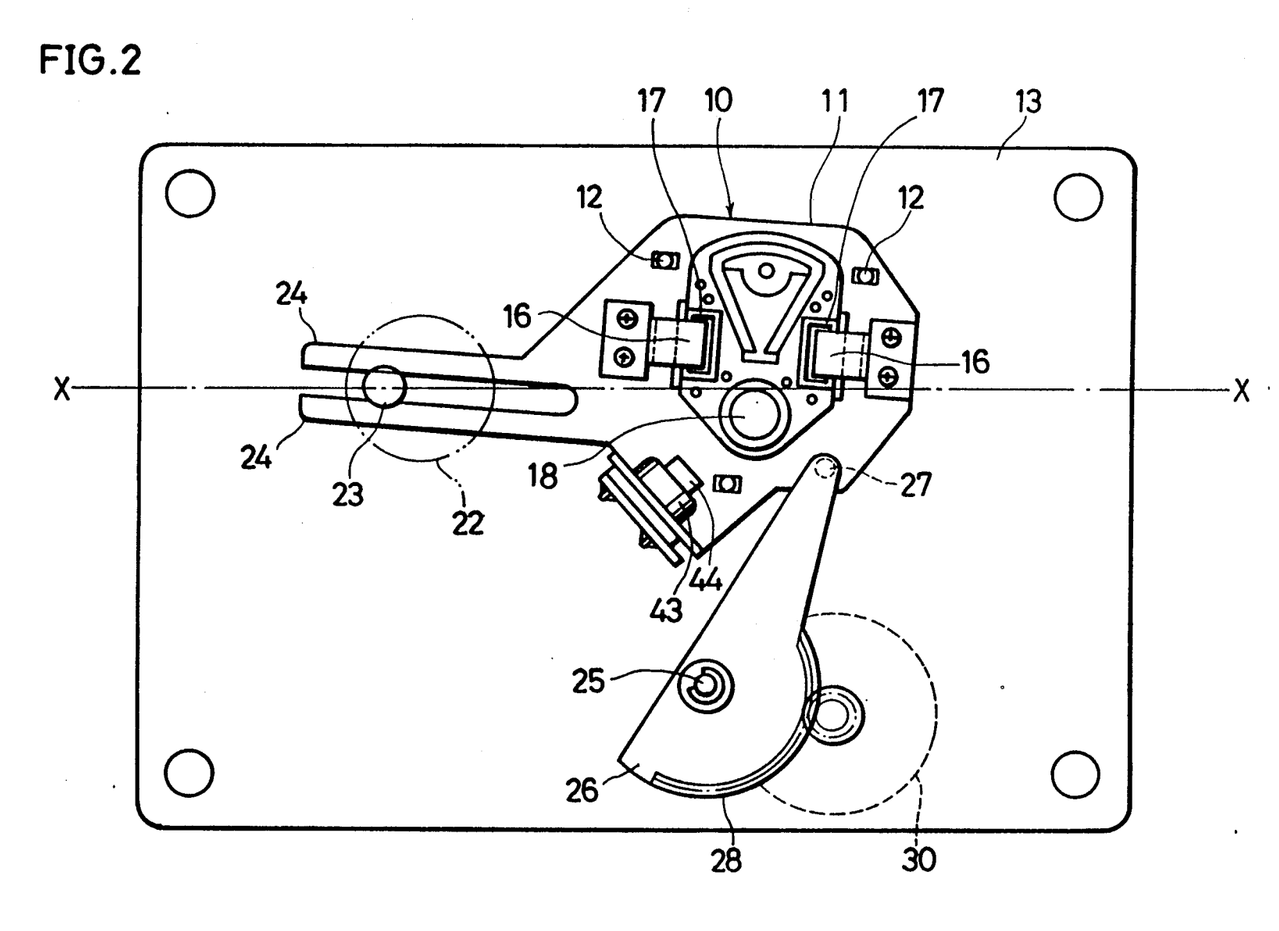
FIG. 2 is a schematic plan view illustrating a state where an optical head shown in FIG. 1 is moved toward the outermost portion of an optical disk.

FIG. 2 illustrates a state where the optical head 10 is in a position facing the outermost portion of the optical disk.

Meanwhile, when the arm 26 moves counterclockwise, the optical head 10 is moved in an arc toward the inside of the disk.

The angle of the diffraction grating 44 in the optical head 10 is corrected by moving the optical head 10 in an arc in accordance with a radial location on the optical disk.

Figure 5:
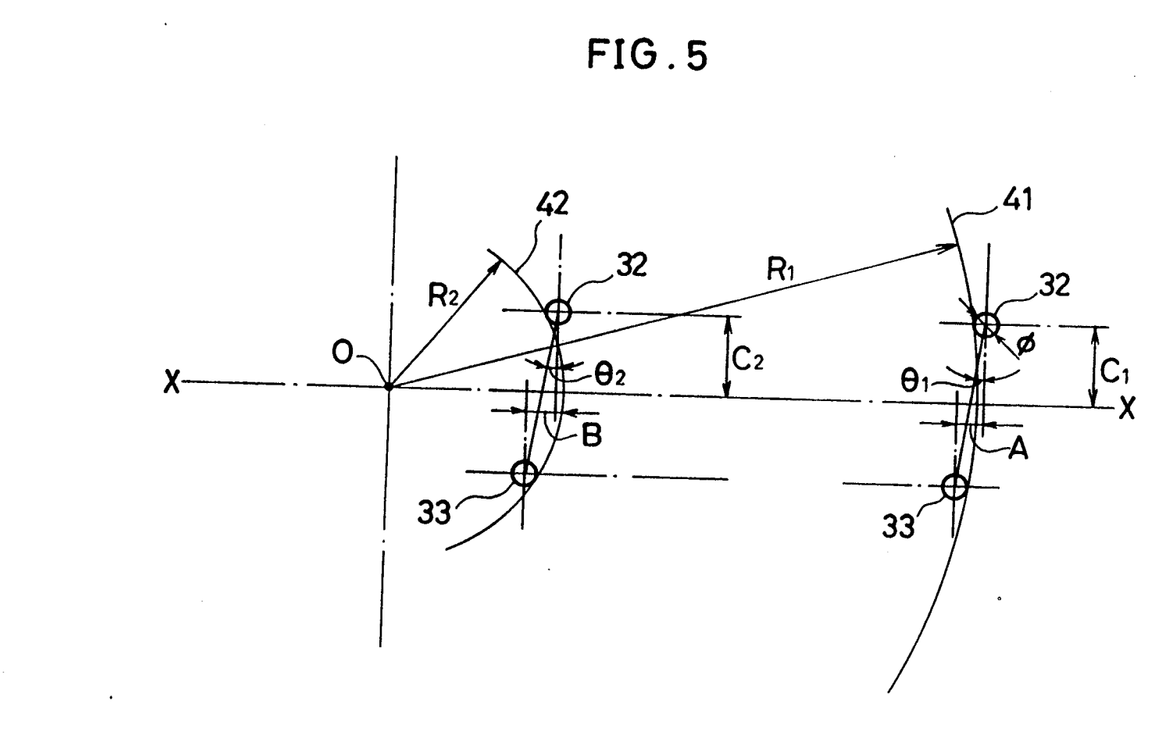
FIG. 5 is a view explaining a correction of the angle of a diffraction grating in the optical-head drive as shown in FIG. 1.
Figure 6:
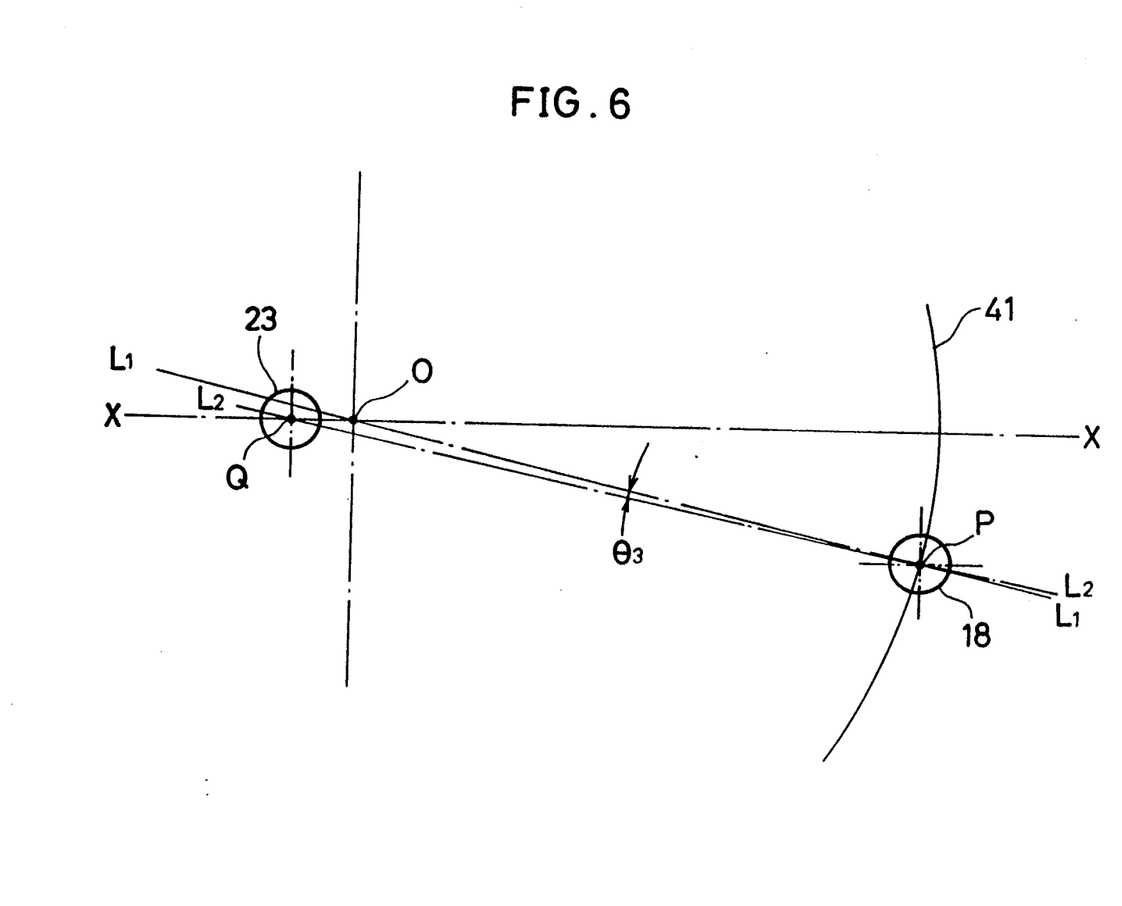
FIG. 6 is a view explaining how to determine the position of a guide shaft in the optical-head drive.

Referring to FIG. 5 and FIG. 6, the following will explain the correction of the angle of the diffraction grating 44 according to the present embodiment.

When the optical head 10 is in the position facing the outermost portion of the optical disk (see FIG. 2), denotement is made such that the radius of an outermost track 41 (e.g. a row of pits on a compact disk or a groove on a rewritable optical disk) is $R_1$, the length of vertical lines from the respective sub-beams 32 and 33 to the straight line X—X passing through the center 0 of the optical disk is $C_1$, the distance between the vertical lines is A, and an angle formed by the straight line connecting the centers of the sub-beams 32 and 33 and each of the vertical lines is $\theta_1$.

Similarly, when the optical head 10 is in the position facing the innermost portion of the optical disk (see FIG. 1), denotement is made such that the radius of an innermost track 42 is $R_2$, the length of vertical lines from the respective sub-beams 32 and 33 to the straight line X—X passing through the center O of the optical disk is $C_2$, the distance between the vertical lines is B, and an angle formed by the straight line connecting the centers of the sub-beams 32 and 33 and each of the vertical lines is $\theta_2$.

Denoting the diameter of each of the spots of the sub-beams 32 and 33 as $\phi$ and supposing that $C_1 \simeq C_2 \simeq C$, $\theta_1$ and $\theta_2$ are given by the following equations (1) and (2), and (3) and (4), respectively.

Namely, when the sub-beams 32 and 33 strike in the vicinity of the outermost track 41, considering a right-angled triangle formed by the disk center 0, the center of the sub-beam 32 and the point of intersection of the vertical line from the sub-beam 32 to the straight line X—X and the straight line X—X, and also considering a right-angled triangle formed by the disk center 0, the center of the sub-beam 33 and the point of intersection of the vertical line from the sub-beam 33 to the straight line X—X and the straight line X—X, A is given by the equation:

$$[\{R_1+(\phi/2)\}^2 - C^2]^{\frac{1}{2}} - [\{R_1-(\phi/2)\}^2 - C^2]^{\frac{1}{2}} = A \quad (1)$$

In the same way, considering a right-angled triangle formed by the center of the sub-beam 32, the point of intersection of the vertical line from the sub-beam 32 to the straight line X—X and the straight line X—X, and the point of intersection of the straight line connecting the center of the sub-beam 32 and that of the sub-beam 33 and the straight line X—X, $\theta 1$ is given by the equation:

$$\tan^{-1}(A/2C) = \theta_1 \quad (2)$$

Similarly, when the sub-beams 32 and 33 strike in the vicinity of the innermost track 42, B and $\theta 2$ is given by the equations:

$$[\{R_2+(\phi/2)\}^2 - C^2]^{\frac{1}{2}} - [\{R_2-(\phi/2)\}^2 - C^2]^{\frac{1}{2}} = B \quad (3)$$

$$\tan^{-1}(B/2C) = \theta_2 \quad (4)$$

When moving the optical head 10 from the innermost portion to the outermost portion or from the outermost portion to the innermost portion, the angle of the diffraction grating 44 needs to be corrected through an angle $\theta_3$, $\theta_3 = \theta_1 - \theta_2$.

Thus, as illustrated in FIG. 6, if the position of the guide shaft 23 is set such that an angle formed by a straight line $L_1$—$L_1$ connecting the center P of the objective lens 18 facing the outermost portion of the optical disk and the center 0 of the optical disk and the straight line $L_2$—$L_2$ connecting the center P of the objective lens 18 and the center Q of the guide shaft 23 equals the angle $\theta_3$, the angle of the diffraction grating 44 is corrected simultaneously with the movement of the optical head 10 driven by means of the arm 26.

With this arrangement, even when the optical head 10 is moved toward the inside or outside of the optical disk, portions of the tracks 41 and 42 exposed to the sub-beams 32 and 33 have the same area. Therefore, tracking is accurately performed independently of radial locations on the optical disk.

In this embodiment, since the optical head 10 is driven by the arm 26 constructed to move in an arc, the optical-head drive has a simple configuration.

Further, the magnet 15 is disposed adjacent to the chassis 13 so as to produce a magnetic attraction effect between them. This prevents the magnetic head 10 from floating from the chassis 13 when it is moved in a radial direction of the optical disk.

.Furthermore, since the magnet 15 is not an extra component but is an essential component provided to drive the objective lens 18, the number of components does not increase.

Figure 7:
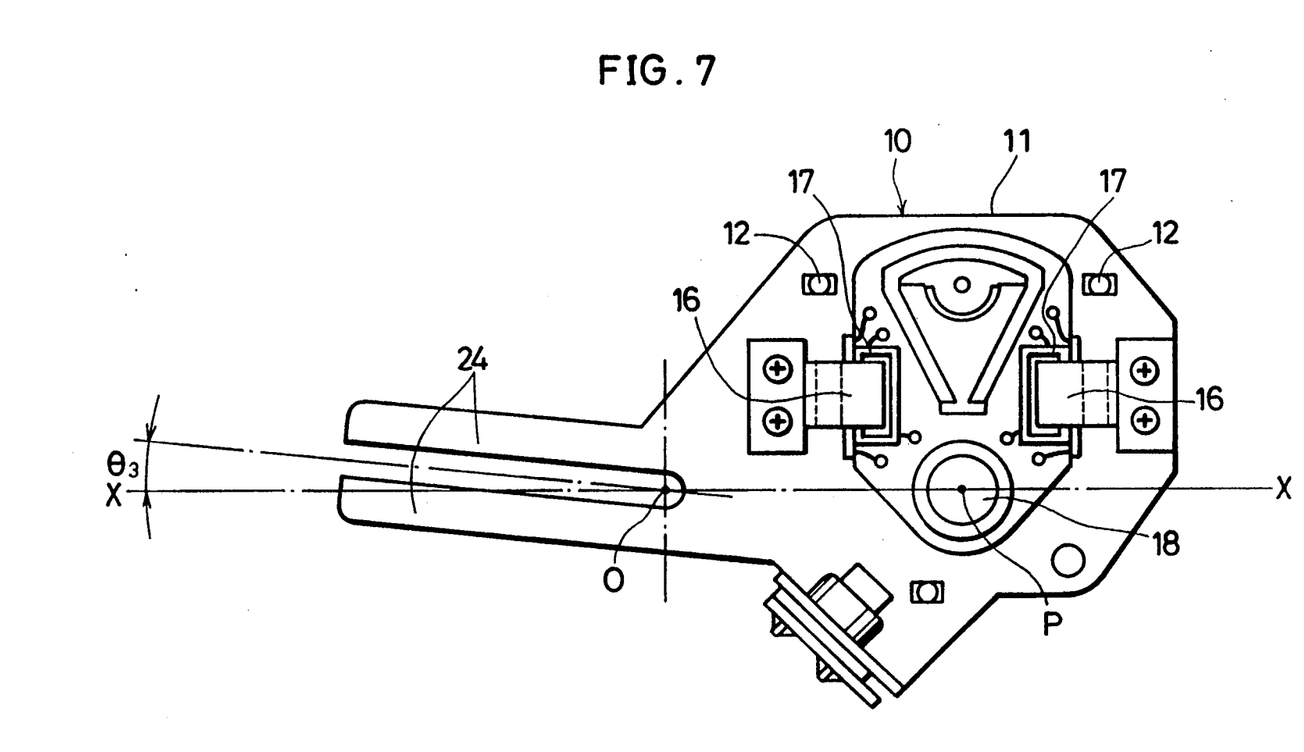
FIG. 7 is a schematic plan view illustrating an optical-head drive as a second embodiment of the present invention.

Referring to FIG. 7, a second embodiment of the present invention will be described below. For the sake of simplifying the explanation, the same numerals are given to members whose functions are similar to that of the members in the drawings relating to the above embodiment, and therefore descriptions are omitted here.

In this embodiment, as illustrated in FIG. 7, the center of the guide shaft 23 (not shown) and of the turn table 22 (not shown), i.e., the center 0 of the optical disk are located on a common .axis. This is a major difference between this embodiment and the above-mentioned embodiment.

Moreover, in this embodiment, the rails 24 do not extend in a direction in which a straight line connecting the center P of the objective lens 18 and the center O of the optical disk extends. In addition, there is another difference that an angle formed by the straight line connecting the center P and the center O and the direction in which the rails 24 extend is equal to the above-mentioned angle $\theta_3$ for correction. As illustrated in the figure, when the optical head 10 is in the position facing the innermost portion of the optical disk, the straight line connecting the center P and the center 0 corresponds to the line X—X.

Except for these differences, the optical-head drive is constructed in the same manner as that in the above embodiment.

Since the optical-head drive moves the optical head 10 in an arc like the above-mentioned embodiment, the correction of the angle of the diffraction grating 44 is performed simultaneously when the optical head 10 is driven.

Further, since there is a difference in the location of the guide shaft 23 between this embodiment and the above-mentioned embodiment, a .desired configuration is selected in accordance with the shape of the spindle motor 20 and other factors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical-head drive, comprising:
    a guide member mounted in the vicinity of, and offset from, the center of an optical disk;
    an optical head having a diffraction grating for splitting a light beam into two sub-beams, an objective lens for converging the sub-beams respectively on the optical disk, and a member slidably guided by the guide member; and
    driving means for moving the optical head to a desired radial location on the optical disk and for a correction of an angle of the diffraction grating, by swinging the optical head around the guide member and causing the slidably guided member to slide along the guide member.

2. The optical-head drive as set forth in claim 1, wherein the driving means comprises:
    a driving section which moves in an arc; and
    a connecting section for rotatably connecting the driving section with the optical head.

3. The optical-head as set forth in claim 2, wherein the guide member is located on a straight line connecting the center of the objective lens and the center of the optical disk.

4. The optical-head drive as set forth in claim 3, wherein the slidably guided member is rectilinear.

5. The optical-head drive as set forth in claim 2, wherein the slidably guided member is rectilinear and is located so as to cross a straight line connecting the center of the objective lens and the center of the optical disk.

6. The optical-head as set forth in claim 5, further comprising:
    roller bearing means;
    a supporting member; and
    wherein the optical head is slidably mounted on the supporting member by said roller bearing means.

7. The optical-head drive as set forth in claim 6, further comprising magnetic circuit means for driving the objective lens and for generating a magnetic attractive force between the optical head and the supporting member.

8. The optical-head drive as set forth in claim 1, further comprising,
    a set of ball bearings; and
    a supporting member,
    wherein the optical head is slidably located on the supporting member via said set of ball bearings.

9. The optical-herd drive as set forth in claim 8, further comprising magnetic circuit means located on said optical head for driving the objective lens, said magnetic circuit means further including a set of magnets disposed adjacent the supporting member for producing a magnetic attraction between the optical head and the supporting member.

10. The optical-head drive as set forth in claim 2, wherein the guide member is located on a straight line connecting the center of the objective lens and the center of the optical disk when the optical head faces an innermost portion of the optical disk and wherein the objective lens is offset from said straight line when the optical head faces an outermost portion of the optical disk.

11. The optical head drive as set forth in claim 4 wherein the slidably guided member comprises a rectilinear bifurcated member straddling the guide member.

12. An optical-head drive, comprising:
a guide member mounted on a chassis in the vicinity of the center of an optical disk;
an optical head positioned over the chassis and including a diffraction grating for splitting a light beam into two sub-beams, an objective lens for converging the sub-beams respectively on the optical disk, and a member slidably guided by the guide member; and
driving means for moving the optical head to a desired radial location on the optical disk and for a correction of an angle of the diffraction grating, by swinging the optical head around the guide member and causing the slidably guided member to slide along the guide member,
said driving means further comprising an angularly displaceable drive section mounted on the chassis, and an arm section located adjacent an optical axis of the objective lens and extending from said drive section to the optical head.

13. The optical-head drive as set forth in claim 12 wherein the guide member is mounted on an axis offset from the center of the optical disk.

14. The optical-head as set forth in claim 12 wherein said drive section includes a peripheral edge including a set of gear teeth and defining an arc of a circle, and additionally including a motor driven drive gear coupled to said gear teeth.

* * * * *